March 25, 1969 — G. L. POULOS — 3,434,734
AUXILIARY SPRING
Original Filed July 6, 1965
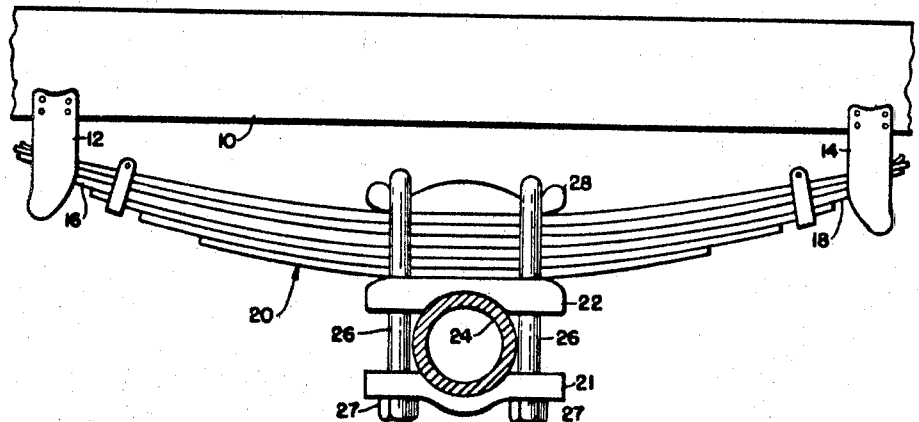
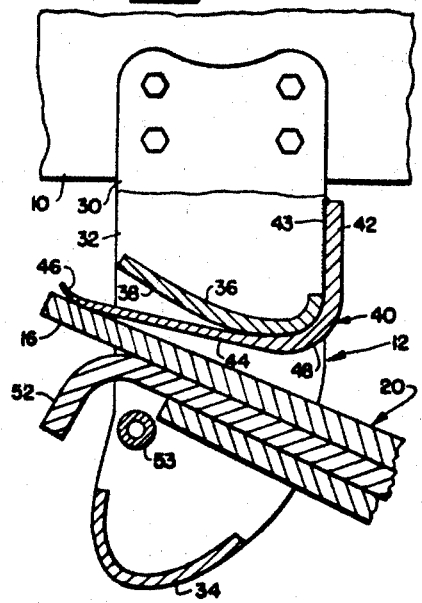
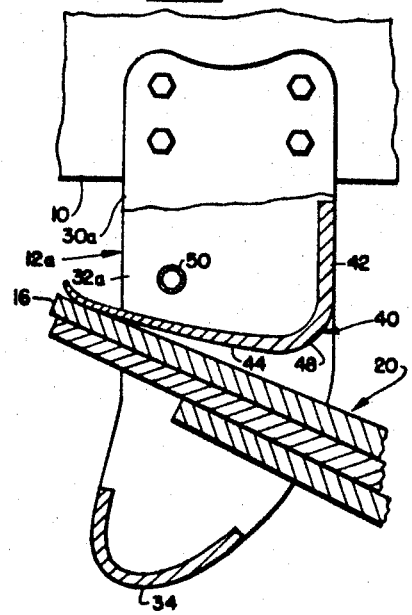
INVENTOR
GUS L. POULOS
BY *Strauch, Nolan, Neale, Nies & Kurz*
ATTORNEYS

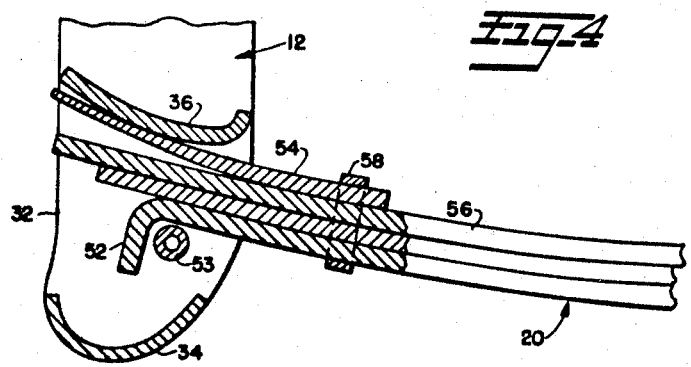
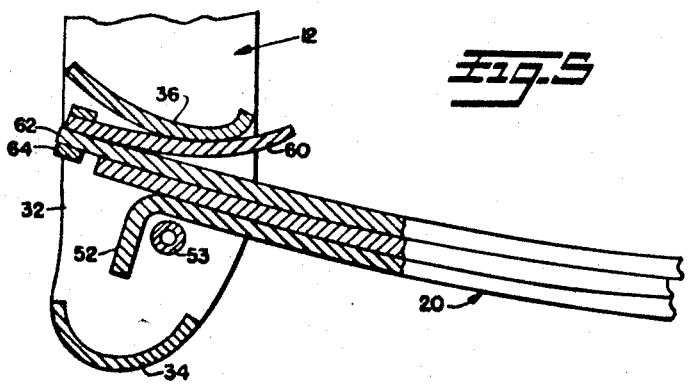

United States Patent Office
3,434,734
Patented Mar. 25, 1969

3,434,734
AUXILIARY SPRING
Gus L. Poulos, Rochester, Mich., assignor to North American Rockwell Corporation, Pittsburgh, Pa., a corporation of Delaware
Original application July 6, 1965, Ser. No. 469,419, now Patent No. 3,379,429, dated Apr. 23, 1968. Divided and this application Dec. 15, 1967, Ser. No. 690,914
Int. Cl. B62d; B60g; B60p
U.S. Cl. 280—124                                    4 Claims

ABSTRACT OF THE DISCLOSURE

A vehicle spring suspension comprises a main leaf spring attached intermediate its ends to an axle assembly with at least one free end received within a frame mounted hanger, there being an auxiliary spring leaf rigidly mounted on the hanger at one end and slidingly bearing on the upper surface of the adjacent end of the main spring leaf, and the hanger having a fixed control surface for variable engagement with the upper surface of the auxiliary spring.

---

This is a division of my copending application Ser. No. 469,419 filed July 6, 1965 for Auxiliary Spring, now United States Letters Patent No. 3,379,429 issued Apr. 23, 1968.

The present invention refers to vehicle suspension systems and more particularly to an improved auxiliary leaf spring end attachment construction.

In vehicle leaf spring suspensions especially in highway vehicles such as trailers equipped with either single or tandem axles and which are provided with leaf spring suspensions in the ends of the leaf spring assemblies are in most cases free and slidingly supported in hanger brackets suspended from the frame of the vehicle to thus allow the changing of the load characteristic of the leaf spring under varying load conditions by changing its effective length. In these conventional embodiments, the leaf spring ends of the upper leaves are upwardly restrained by sliding on a surface within the hanger brackets which is usually curved and the downward rebound is usually absorbed by a pin within the hanger bracket or the closed bottom thereof.

These conventional arrangements have a serious drawback in that, when the vehicle is empty, the ride frequency of the suspension is extremely high. Conversely, when the vehicle is loaded the effective length of the leaf spring is reduced due to the spring ends sliding outwardly along the rounded bracket surfaces, however, without the beneficial effect of ride improvement which would be desirable.

The present invention provides means in the form of auxiliary springs inserted between the spring ends and their respective hanger brackets to eliminate the above drawbacks.

Accordingly, the main object of the present invention is to provide auxiliary spring means between the sliding ends and their respective hanger brackets of a vehicle leaf spring suspension to reduce the ride frequency of the suspension when the vehicle is empty and to increase the designed spring rate of the suspension when the vehicle is loaded.

Another object is the provision of auxiliary springs at the spring hangers of a vehicle leaf suspension to reduce the noise level of the suspension as the vehicle passes over obstructions.

In general, the improvement consists of a single, relatively short, tapered auxiliary spring leaf attached in cantilever fashion to the hanger bracket in such way that the cantilever spring arm of this auxiliary spring resiliently supports the spring ends of the conventional leaf spring assembly. Thereby, the auxiliary cantilever leaf end support spring may be successively brought into contact with different portions of the existing curved surface in the conventional hanger bracket to limit its range of deflection upon load deflection of the suspension, or the conventional curved spring end abutment in the hanger bracket may be eliminated entirely and a pin or similar other means be provided for the same purposes.

The drawings forming part of the specification illustrate four embodiments but it shall be understood that other similar arrangements are feasible and are intended to be embraced within the scope of the appended claims.

In the drawings:

FIGURE 1 illustrates a representative vehicle leaf spring arrangement in which the present novel improvement may be incorporated;

FIGURE 2 is an enlarged section fragmental view of a leaf spring end support embodying one form of the present invention;

FIGURE 3 is an illustration similar to FIGURE 2 showing the present invention in another form; and FIGURES 4 and 5 are illustrations similar to FIGURES 2 and 3 but showing other embodiments of the invention.

With reference to FIGURE 1 numeral 10 indicates the frame of a road vehicle such as a trailer, truck or the like which may have attached thereto as by bolts, rivets or welding, spaced hanger brackets 12 and 14 adapted to receive the ends 16, 18 of the upper leaves of a multi-leaf spring assembly 20 to be guided and supported therein.

The central portion of the leaf spring assembly 20 is retained between spring seats or pads 21 and 22 attached to an axle assembly 24 below the frame 10 and is clamped thereto as by U-bolts 26 and a pressure plate 28.

This suspension arrangement so far is conventional and illustrative only, since the hanger brackets, spring seat and leaf spring construction may assume other known configurations. Likewise any number of leaves may be used in the leaf spring assembly the actual number being determined by the load requirement of the vehicle.

With particular reference to FIGURE 2 the hanger brackets 12 (or 14) may be enclosures having laterally outer 30 and inner side walls 32 connected by a bottom portion 34. The bracket is open in the longitudinal direction of the leaf spring assembly 20 so that the ends 16 (or 18) of the upper and longest leaves thereof may extend into the brackets between the side walls 30 and 32.

Positioned within the bracket 12 (or 14) in the upper portion thereof is fixed abutment 36 which extends across the space between the side walls 30 and 32 to which it may be attached as by welding. The abutment 36 has an upwardly curved lower surface 38 against which in similar conventional suspension units the upper leaves of the leaf spring assembly slidingly abut.

In the present invention an auxiliary cantilever spring member 40 is provided between the abutment 36 and the leaf spring ends which in the embodiment of FIGURE 2 consists of a leaf of spring steel which is L-shaped into the form of a hook having a vertical flange section 42 and a spring section 44 extending therefrom at substantially right angle in the direction of the adjacent end of spring 20. The vertical flange section 42 of spring member 40 may be bolted, riveted, welded or otherwise secured to the hanger bracket 12 (or 14) as indicated at 43 inwardly towards the axle 24 so that the depending spring section 44 extends through the bracket 12 and outwardly underneath the abutment 36 in a direction away from the axle 24. When relaxed spring section 44 extends substantially parallel to the vehicle frame.

The spring section 44 is tapered and reduced in cross section from the flange section 42 towards its free end 46 where it is turned upward slightly. The bent portion 48 of the spring member 40 between the flange section 42 and spring section 44 is in abutment with and follows the curved contour of the abutment 36 at its beginning. However, when the vehicle is empty or only lightly loaded, the spring section will be substantially normal to flange 42.

The outer ends 16 (or 18) of the leaf spring assembly 20 extend within the hanger brackets 12 (or 14) and their upper leaves abut the underside of the spring section 44 of the auxiliary spring member 40 near its hooked end 46. When the vehicle is empty or only lightly loaded the spring section 44 of the auxiliary spring is only slightly depressed upwardly, resiliently spacing the main spring end 16 from the lower surface 38 of the abutment 36, as illustrated in FIGURE 1.

The stiffness and the rate of the auxiliary spring 40 whose spring section 44 acts as a cantilever beam is such that it exerts sufficient force to hold the spring end 16 of the main spring away from the curved abutment 36 when the vehicle is empty or lightly loaded. In this load condition the auxiliary spring 40 acts effectively as a damper during articulation of the suspension and thereby sufficiently reduces the ride frequency and chatter of the main spring ends with consequent benefit to a more comfortable ride and increased fatigue life of the main spring by the reduced ride frequency. At the same time the noise level of the suspension is considerably reduced.

As the vehicle is increasingly loaded the spring portion 44 of auxiliary spring 40 is further compressed relatively upwardly towards the curved surface 38 thereby increasing the downward force of the auxiliary spring which acts on the main spring ends. At the same time with increased load the spring ends 16 and 18 slide further outwardly on the hanger brackets, thus decreasing the effective length of the spring assembly 20 but at the same time increasing the designed spring rate due to the now heavier loaded auxiliary spring 40 which force tends to lift the vehicle frame away from the main spring ends.

The embodiment of FIGURE 3 illustrates a hanger bracket 12a which is not equipped with the usual fixed abutment plate 36 of FIGURE 2.

In this case, the vertical flange 42 of auxiliary spring 40 is rigidly attached directly at its flange portion 42 between the sidewalls 30a and 32a inside the bracket as by welding as in FIGURE 2. The relative upward depression of the auxiliary spring in this case is limited by a fixed pin or bolt 50 extending through and secured as by welding or the like to the bracket above the spring section 44. This embodiment functions essentially in the same manner as FIGURE 2.

The outer ends 16 and 18 of the spring assembly may be retained against sliding out of the hanger brackets 12 or 14 by a construction such as shown for example in the U.S. Patent No. 3,074,738 issued Jan. 22, 1963 to James C. Ward for Axle Suspension Unit.

Another such spring end retention means is shown in FIGURES 2, 4 and 5. Referring to FIGURE 2 the outer end portion of one of the leaves of the spring assembly 20 is turned downwardly to provide a hook 52 which will engage a fixed transverse pin or tube 53 secured to side walls 32 and 34 of the bracket 12 to prevent the spring assembly from being disengaged from the hanger bracket 12 by movement to the right, as for example when the trailer wheels hit an obstruction or the trailer brakes are applied suddenly. As will be understood, a similar hook and pin is used at the right end of the leaf spring assembly 20 of FIGURE 1 to retain it in the right-hand hanger bracket 14. Similar hooks 52 on the springs and pins or tubes 53 are shown in the embodiments of FIGURES 4 and 5.

In the embodiments of FIGURES 4 and 5 the auxiliary cantilever spring members are attached to the multi-leaf spring assemblies 20 instead of to the hanger brackets.

Referring to FIGURE 4 an auxiliary cantilever spring 54 is bowed upwardly and secured in position between the hanger abutment 36 and the upper leaf 56 of the spring assembly 20 as by a spring clip 58. Alternatively, it may be secured to the upper leaf 56 by bolts, rivets or other means.

In the embodiment of FIGURE 5, the auxiliary cantilever spring 60 is secured in position between the hanger abutment 36 and the upper leaf 62 of the main spring assembly 20 as by bolts, rivets or the spring clip shown at 64. In FIGURE 5 the auxiliary spring 60 is secured substantially to the outer end of the upper spring leaf 62, and its free upwardly bowed end extends inwardly toward the axle rather than away from it. The auxiliary springs 54 and 60 of FIGURES 4 and 5 are reduced in cross-section from their secured ends to their free ends. They function in the combination in essentially the same manner as do those in the embodiments of FIGURES 2 and 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a vehicle spring suspension for flexibly interconnecting an axle assembly with the vehicle frame, a longitudinally extending main spring leaf attached to said axle assembly and extending away therefrom, a hanger on said frame for receiving the free end of said main spring leaf, an auxiliary spring leaf having a fixed mounting connection at one end on the hanger and extending flexibly above the main spring leaf in the direction of the adjacent end of said spring leaf for sliding bearing engagement with the upper surface of said adjacent end of the main spring leaf, and means defining a fixed arcuate downwardly convex control surface on said hanger for engagement with the upper surface of said auxiliary spring leaf, said control surface having one end in contact with said auxiliary spring leaf at said anchor connection during no or light vehicle loading and having gradually increasing area contact with said auxiliary spring leaf with increased vehicle loading.

2. In the vehicle spring suspension defined in claim 1, said auxiliary spring leaf being thicker at its fixed inner end and having gradually decreasing thickness toward its outer end.

3. In a vehicle spring suspension system, a fixed member rigid with the frame of the vehicle and having a lower sloping surface extending longitudinally of the vehicle, an axle, a resilient leaf spring member secured to said axle, said leaf spring member having an end extending below said fixed member, and an auxiliary spring leaf having a thicker end affixed to said fixed member and a gradually reducing thickness portion extending between said members to separate them and terminating in a flexible section slidably bearing on the upper surface of said resilient leaf spring member, said auxiliary spring leaf being deformable to engage different surface areas of both of said members with changes in the vehicle loading and having its free end extending toward and meeting said resilient leaf spring member at an acute angle thereto.

4. In a vehicle spring suspension for flexibly interconnecting an axle assembly with the vehicle frame, a longitudinally extending main spring leaf member attached to said axle assembly and extending away therefrom, a hanger member on said frame for receiving the free end of said main spring leaf member, and an auxiliary spring leaf rigidly anchored at its inner end to said hanger member and extending outwardly above said main spring leaf member in the direction of the adjacent end of said main spring leaf member with its outer end in sliding bearing engagement with the upper surface of said adjacent end of the main spring leaf, means on the hanger member defining a fixed sloping surface above and in the path of deflection of said auxiliary spring, said auxiliary spring being deformable to engage different surfaces of both said members with changes in vehicle loading, and said auxiliary spring leaf being thicker at the end anchored to the hanger member and gradually reducing in thickness toward its outer end and having decreased effective length and increased resistance to deflection as the vehicle load increases.

References Cited
UNITED STATES PATENTS

| | | | |
|---|---|---|---|
| 3,194,580 | 7/1965 | Hamlet | 267—56 X |
| 2,691,521 | 10/1954 | Bennett | 267—56 |

PHILIP GOODMAN, *Primary Examiner.*

U.S. Cl. X.R.

267—56